(12) United States Patent
Yapici

(10) Patent No.: US 11,927,179 B2
(45) Date of Patent: Mar. 12, 2024

(54) BI-METAL ACTUATOR

(71) Applicant: OZYEGIN UNIVERSITESI, Istanbul (TR)

(72) Inventor: Guney Guven Yapici, Istanbul (TR)

(73) Assignee: OZYEGIN UNIVERSITESI, Istanbul (TR)

( * ) Notice: Subject to any disclaimer, the term of this patent is extended or adjusted under 35 U.S.C. 154(b) by 0 days.

(21) Appl. No.: 17/923,619

(22) PCT Filed: May 7, 2020

(86) PCT No.: PCT/TR2020/050400
§ 371 (c)(1),
(2) Date: Nov. 7, 2022

(87) PCT Pub. No.: WO2021/225536
PCT Pub. Date: Nov. 11, 2021

(65) Prior Publication Data
US 2023/0184231 A1    Jun. 15, 2023

(51) Int. Cl.
*F03G 7/06* (2006.01)
*B32B 3/08* (2006.01)
(Continued)

(52) U.S. Cl.
CPC .............. *F03G 7/0614* (2021.08); *B32B 3/08* (2013.01); *B32B 7/027* (2019.01); *B32B 7/12* (2013.01);
(Continued)

(58) Field of Classification Search
CPC ..... F03G 7/0614; F03G 7/0613; B32B 7/027; B32B 7/12; B32B 3/08; B32B 15/18; B32B 15/20; B32B 2307/304; B32B 2307/51
See application file for complete search history.

(56) References Cited

U.S. PATENT DOCUMENTS 5,611,874 A * 3/1997 Zadno-Azizi ......... B32B 15/013
                                                              343/715
5,700,337 A * 12/1997 Jacobs .................. B29C 70/088
                                                              156/298

(Continued)

FOREIGN PATENT DOCUMENTS

WO          9729668 A1    8/1997

*Primary Examiner* — Loren C Edwards
(74) *Attorney, Agent, or Firm* — Bayramoglu Law Offices LLC

(57) ABSTRACT

A bi-metal actuator includes a shape memory alloy layer thermally actuated, a superelastic alloy layer fixed along to at least a part of the shape memory alloy layer, and at least one deformation sensor. The shape memory alloy layer has an initial shape at or below a transition start temperature $T_S$ and a final shape at or above a transition end temperature $T_E$, has transitional shapes between the initial shape and the final shape which is formed according to the temperature between the transition start temperature $T_S$ and the transition end temperature $T_E$ of the shape memory alloy layer. The at least one deformation sensor is provided along at least a part of the superelastic alloy layer for measuring strain values of the superelastic alloy layer indicating the current form of the shape memory alloy layer.

20 Claims, 1 Drawing Sheet

(51) Int. Cl.
    *B32B 7/027*         (2019.01)
    *B32B 7/12*          (2006.01)
    *H01H 37/32*        (2006.01)
    *B32B 15/18*        (2006.01)
    *B32B 15/20*        (2006.01)

(52) U.S. Cl.
    CPC ......... *F03G 7/0613* (2021.08); *H01H 37/323* (2013.01); *B32B 15/18* (2013.01); *B32B 15/20* (2013.01); *B32B 2307/304* (2013.01); *B32B 2307/51* (2013.01)

(56) References Cited

U.S. PATENT DOCUMENTS

| | | | |
|---|---|---|---|
| 2004/0191556 A1 | 9/2004 | Jardine | |
| 2007/0239138 A1* | 10/2007 | Lawrence | A61B 1/012 604/95.05 |
| 2017/0234306 A1* | 8/2017 | Vanden Aker | C22C 19/007 60/529 |
| 2019/0278047 A1* | 9/2019 | Liedtke | F03G 7/0614 |

\* cited by examiner

BI-METAL ACTUATOR

CROSS REFERENCE TO THE RELATED APPLICATIONS

This application is the national phase entry of International Application No. PCT/TR2020/050400, filed on May 7, 2020, the entire contents of which are incorporated herein by reference.

TECHNICAL FIELD

The present invention relates to a bi-metal actuator, specifically a bi-metal actuator comprising a shape memory and superelastic alloy pair.

BACKGROUND

An actuator is an element of an apparatus which is responsible for moving and controlling a mechanism or system. An actuator requires a control signal and a source of energy for providing a movement. There are different kinds of actuators according to their structures or working principle such as mechanical, hydraulic, pneumatic, electric, magnetic and thermal.

Bi-metal strips are a kind of thermal actuators converting a temperature change into mechanical displacement. Conventional bi-metal strips consist of two strips of different metals which expand at different rates as they are heated. The metal strip pair is usually steel-copper, or in some cases steel-brass.

In some industries such as aerospace, defense, automotive and especially medical industries there is a need for an actuator with small footprint. Conventional bi-metal strips in small sizes are not sufficient for providing high range of motion. Moreover, since they are susceptible to break after a few actuation cycles, they are not reliable for some technology areas.

SUMMARY

Consequently, there is still a need in the art for an actuator which is reliable for high number of actuation cycles and having high range of motion while having a small footprint (compact and lightweight) and which has a feedback mechanism for determining the position of the actuator (magnitude of actuation).

BRIEF DESCRIPTION OF THE DRAWINGS

An exemplary embodiment of the present invention is illustrated by way of example in the accompanying drawings to be more easily understood and uses thereof will be clearer when considered in view of the detailed description, in which like reference numbers indicate the same or similar elements, and the following figures in which.

Figure 1:
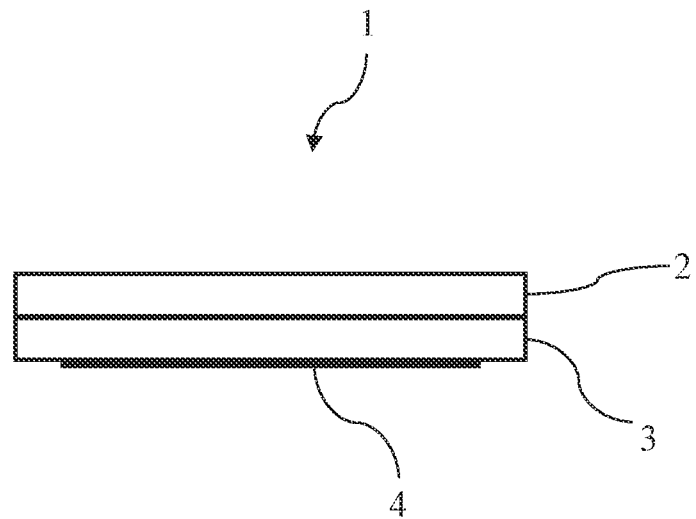
FIG. 1 is a schematic view of bi-metal actuator in a straight form in one exemplary embodiment of the present invention.
Figure 2:
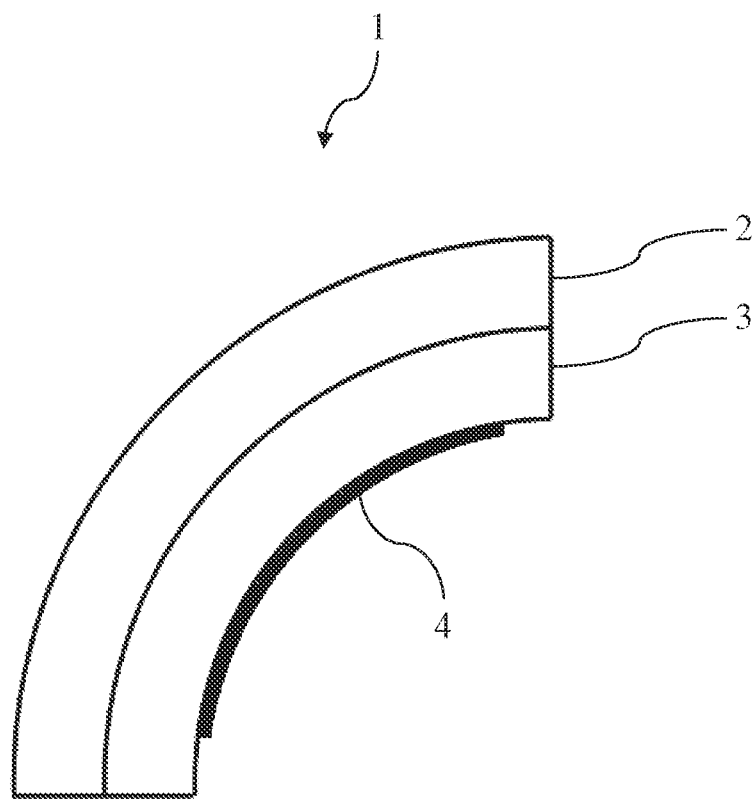
FIG. 2 is a schematic view of bi-metal actuator in a bent form in one exemplary embodiment of the present invention.

The elements illustrated in the figures are numbered as follows:
5. Bi-metal actuator
6. Shape memory alloy layer
7. Superelastic alloy layer
8. Deformation sensor

DETAILED DESCRIPTION OF THE EMBODIMENTS

The present invention relates to a bi-metal actuator (1) comprises a shape memory alloy layer (2) thermally activated by any heat source, a superelastic alloy layer (3) fixed along to at least a part of the shape memory alloy layer.

The shape memory alloy layer (2) has an initial shape at or below a transition start temperature $T_S$ and a final shape at or above a transition end temperature $T_E$ and has transitional shapes between the initial shape and the final shape which are formed according to the temperature between the transition start temperature $T_S$ and the transition end temperature $T_E$ of the shape memory alloy layer (2). The superelastic alloy layer (3) does not retain permanent deformation during motions (transformations) of the shape memory alloy layer (2) and is perfectly unaffected by the raised temperature and the stress induced during the motion of the shape memory alloy layer (2).

The present bi-metal actuator (1) also comprises at least one deformation sensor (4) provided along at least a part of the superelastic alloy layer (3) for measuring strain (change in length per original length) of the superelastic alloy layer (3) and so the shape memory alloy layer (2) indicating current shape of the shape memory alloy layer (2).

As used herein, the transition temperature also means the phase transformation temperature.

When an electric current is applied to the shape memory alloy layer (2), the current passes through the shape memory alloy layer (2) and the temperature of the shape memory alloy layer (2) starts to increase by the resulting resistive heating.

The shape memory alloy layer (2) can also be heated by a heat source such as convective and radiative heat transfer from the environment.

Upon heating, when temperature of the shape memory alloy layer (2) reaches at the transition start temperature $T_S$, the shape memory alloy layer (2) starts to deform to the final shape from the initial shape. In a temperature between the transition start temperature $T_S$ and the transition end temperature $T_E$, the shape memory alloy layer (2) is deformed to a transitional shape. If the temperature reaches at or above the transition end temperature $T_E$, form of the shape memory alloy layer (2) is in the final shape. During these deformations, the superelastic alloy layer (3) acts against the motion. The superelastic alloy layer (3) exerts an opposing force for deformations of the shape memory alloy layer (2) from the initial shape to a transitional shape or from a transitional shape to the final shape.

When the applied current is cut, the shape memory alloy layer (2) starts to get cold and to deform back to the initial shape from the final shape or a transitional shape. If the temperature reaches at or below the transition start temperature $T_S$, form of the shape memory alloy layer (2) is in the initial shape. Considering two-way memory effect, since the shape memory alloy layer (2) is not actively cooled, the duration for cooling and thus deforming back to the initial shape of the shape memory alloy layer (2) is relatively high for certain applications. For reducing the duration, the superelastic alloy layer (3) acts in favour of the reverse deformations. The superelastic alloy layer (3) exerts a recovery force for the reverse deformations of the shape memory alloy layer (2) from the final shape to the transitional shape or from a transitional shape to the initial shape.

Moreover, due to the superelastic alloy layer (3), the shape memory alloy layer (2) which has one-way memory effect may also be used for the bi-metal actuator (1). A shape memory alloy layer (2) with one-way memory effect is activated when temperature is at or above the transition start temperature $T_S$. Then, when the temperature decreases below the transition start temperature $T_S$, the shape memory alloy layer (2) keeps its deformed shape such as final shape and cannot deform back to the initial shape by itself. However, via the recovery force exerted by the superelastic alloy layer (3), the shape memory alloy layer (2) is deformed back to the initial shape.

The deformation sensor (4) is for measuring strain (change in length per original length) of the superelastic alloy layer (3) and thus of the shape memory alloy layer (2). Since the strain value of the shape memory alloy layer (2) is directly related to its shape, each strain value corresponds to a specific shape of the memory alloy layer (2). Thus, the current shape (the initial shape, the final shape or any transitional shape) of the shape memory alloy layer (2) which is also the form of the bi-metal actuator (1) is determined by tracking the strain value from the deformation sensor (4). The strain value can be used as a feedback to a system to control the bi-metal actuator. The superelastic alloy layer (3) provides a perfect substrate for deformation sensor. The superelastic alloy layer (3) is pseudoelastic, and thus does not retain permanent deformation during motions (transformations) of the shape memory alloy layer (2). The shape memory alloy layer (2) deforms hack into the exact initial shape with the help of the recovery force applied by the superelastic; alloy layer (3). Any other elastic material other than the superelastic alloy layer (3) may move the shape memory alloy layer (2) to the initial shape with a residual deformation (slight, but important, difference according to the initial shape) after a few cycles/actuations. The residual deformation on the shape memory alloy layer (2) may lead to an erroneous residual strain value causing faulty determination of current form of the shape memory alloy layer (2).

In one embodiment of the present invention, the shape memory alloy layer (2) and/or the superelastic alloy layer (3) are preferably a NiTi alloy and/or copper based alloys such as, but not limited to, CuZnAl, CuMnAl, CuZnNi and/or iron based such as FeMnSi, FeMnAl, FePt, cobalt based and/or titanium based (without nickel). Any material composition that allows the superelastic alloy layer (3) retain its superelastic properties and the shape memory alloy layer (2) retain its shape memory properties at the operation temperature envelope of the bi-metal actuator is within the context of this invention.

In one embodiment of the present invention, the shape memory alloy layer (2) is a NiTi alloy with nominal composition of 54.5% Nickel and 45.5% Titanium which has shape memory properties and transition temperatures is between 30° C. (transition start temperature $T_S$)-60° C. (transition end temperature $T_E$). Superelastic alloy layer (3) is a NiTi alloy with nominal composition of 56% Nickel and 44% Titanium having superelastic (pseudoelasticity) properties above 10° C.

In one embodiment of the present invention, the bi-metal actuator (1) comprises a first terminal connected to the shape memory alloy layer (2) for providing electric current to the shape memory alloy layer (2).

In one embodiment of the present invention, the bi-metal actuator (1) comprises a second terminal connected to deformation sensor (4) for receiving signal for strain values.

In one embodiment of the bi-metal actuator (1), layers (the shape memory alloy layer (2) and the superelastic alloy layer (3)) are in the form of strip.

In one embodiment of the bi-metal actuator (1), the at least one deformation sensor (4) is preferably a resistance based and/or thin film/foil based, and/or semiconductor based and/or piezo based (piezoresistive or piezoelectric) and/or fiber bragg grating based strain gauge.

In one embodiment of the bi-metal actuator (1), a deformation sensor (4) which is susceptible for thermal drifting may be used. For this kind of embodiments, any temperature compensation method or means such as using dummy gauge technique with Wheatstone bridge, covering the bi-metal actuator (1) with an insulating layer may be provided.

In one embodiment of the bi-metal actuator (1), the superelastic alloy layer (3) is fixed along to at least a part of the shape memory alloy layer (2) by mechanical or metallurgical fastening or chemicals such as adhesive (for instance cyanoacrylates or epoxies) means or method. In preferred embodiment of the invention, fixation is made by a thermally insulative adhesive for minimizing thermal drifting on the deformation sensor (4). The adhesive may also or solely be a temperature resistant, preferably above 60° C.

In one embodiment of the bi-metal actuator (1), the deformation sensor (4) is provided along at least a part of the superelastic alloy layer (3) by mechanical or metallurgical fastening or chemicals such as adhesive (for instance cyanoacrylates or epoxies) means or method. In preferred embodiment of the invention, the deformation sensor (4) is provided by a thermally insulative adhesive for minimizing thermal drifting on the deformation sensor (4). The adhesive may also or solely be temperature resistant, preferably above 60° C.

In one embodiment of the present invention, the bi-metal actuator (1) comprises a thermal insulating layer between the deformation sensor (4) and the superelastic alloy layer (3) for minimizing thermal drifting on the deformation sensor (4), The insulating layer can be elastic, and the insulating layer is preferable for temperature compensation.

In one embodiment of the present invention, the bi-metal actuator (1) comprises an elastic thermal insulating layer between the shape memory alloy layer (2) and the superelastic alloy layer (3).

In one embodiment of the bi-metal actuator (1), the superelastic alloy layer (3) has a transition temperature interval different, preferably lower, than an interval between the transition start temperature $T_S$ and the transition end temperature $T_E$ of the shape memory alloy layer (2). Thus, shape/form and mechanical properties of the superelastic alloy layer (3) is perfectly unaffected by the stress induced during the actuation of the shape memory alloy layer (2). Superelastic alloy-layer (3) shall also be perfectly unaffected by the raised temperature of the shape memory alloy layer (2).

In one embodiment of the bi-metal actuator (1), initial shape is in a straight form and the final shape is in a bent form or initial shape is in a bent form and the final shape is in a straight form. Bent form may be up to 180° bending (C shape form) of the initial shape. In a variation of this embodiment both the initial and final shapes can be in a straight form. The final shape can be a compressed or extended state of the initial shape along the longitudinal direction.

The invention claimed is:

1. A bi-metal actuator, comprising a shape memory alloy layer thermally activated by a heat source; a superelastic alloy layer fixed along at least one part of the shape memory alloy layer; and at least one deformation sensor;
   wherein the shape memory alloy layer has an initial shape at or below a transition start temperature $T_S$, a final shape at or above a transition end temperature $T_E$, and a plurality of transitional shapes between the initial shape and the final shape, the plurality, of transitional shapes are formed according to a temperature between the transition start temperature $T_S$ and the transition end temperature $T_E$ of the shape memory alloy layer;
   wherein the superelastic alloy layer does not retain permanent deformation during motions of the shape memory alloy layer, the superelastic alloy layer opposes the motions of the shape memory alloy layer during a transition from the initial shape to the final shape, and the superelastic alloy layer possesses superelastic properties at a Celsius temperature that is a least 20 degrees below said transition start temperature $T_S$ in Celsius; and
   wherein the at least one deformation sensor is provided along at least a part of the superelastic alloy layer for measuring a strain of the superelastic alloy layer and the shape memory alloy layer indicating a current form of the shape memory alloy layer.

2. The bi-metal actuator according to claim 1, further comprising a first terminal connected to the shape memory alloy layer for providing electric current to the shape memory alloy layer.

3. The bi-metal actuator according to claim 2, further comprising a second terminal connected to the at least one deformation sensor for receiving signals for a plurality of strain values.

4. The bi-metal actuator according to claim 3, wherein the strain values are used as a feedback to a system to control the bi-metal actuator.

5. The bi-metal actuator according to claim 4, wherein the shape memory alloy layer and the superelastic alloy layer are in a strip form.

6. The bi-metal actuator according to claim 4, wherein the at least one deformation sensor is one selected from a resistance based thin film/foil based gauge, a semiconductor based gauge, a piezo based gauge or a fiber bragg grating based strain gauge.

7. The bi-metal actuator according to claim 3, wherein the shape memory alloy layer and the superelastic alloy layer are in a strip form.

8. The bi-metal actuator according to claim 3, wherein the at least one deformation sensor is one selected from a resistance based thin film/foil based gauge, a semiconductor based gauge, a piezo based gauge or a fiber bragg grating based strain gauge.

9. The bimetal actuator according to claim 3, wherein the superelastic alloy layer is fixed to at least a part of the shape memory alloy layer by a thermally insulative adhesive provided along at least one part of the superelastic alloy layer.

10. The bi-metal actuator according to claim 2, wherein the shape memory alloy layer and the superelastic alloy layer are in a strip form.

11. The bi-metal actuator according to claim 2, wherein the at least one deformation sensor is one selected from a resistance based thin film/foil based gauge, a semiconductor based gauge, a piezo based gauge or a fiber bragg grating based strain gauge.

12. The bimetal actuator according to claim 2, wherein the superelastic alloy layer is fixed to at least a part of the shape memory alloy layer by a thermally insulative adhesive provided along at least one part of the superelastic alloy layer.

13. The bi-metal actuator according to claim 1, wherein the shape memory alloy layer and the superelastic alloy layer are in a strip form.

14. The bi-metal actuator according to claim 13, wherein the at least one deformation sensor is one selected from a resistance based thin film/foil based gauge, a semiconductor based gauge, a piezo based gauge or a fiber bragg grating based strain gauge.

15. The bi-metal actuator according to claim 1, wherein the at least one deformation sensor is one selected from a resistance based thin film/foil based gauge, a semiconductor based gauge, a piezo based gauge or a fiber Bragg grating based strain gauge.

16. The bi-metal actuator according to claim 1, wherein the superelastic alloy layer is fixed to at least a part of the shape memory alloy layer by a thermally insulative adhesive provided along at least one part of the superelastic alloy layer.

17. The bi-metal actuator according to claim 1, further comprising a thermal insulating layer between the at least one deformation sensor and the superelastic alloy layer.

18. The bi-metal actuator according to claim 1, wherein the superelastic alloy layer has a transition temperature interval different than an interval between the transition start temperature $T_S$ and the transition end temperature $T_E$ of the shape memory alloy layer.

19. The bi-metal actuator according to claim 1, wherein the initial shape is in a straight form, and the final shape is in a bent form or wherein the initial shape is in the bent form and the final shape is in the straight form.

20. The bi-metal actuator according to claim 1, wherein the final shape is in a compressed or extended state of the initial shape along a longitudinal direction.

* * * * *